W. G. R. BRAEMER.
METHOD OF HUMIDITY CONTROL.
APPLICATION FILED MAR. 28, 1914.
1,101,902.
Patented June 30, 1914.
2 SHEETS—SHEET 1.
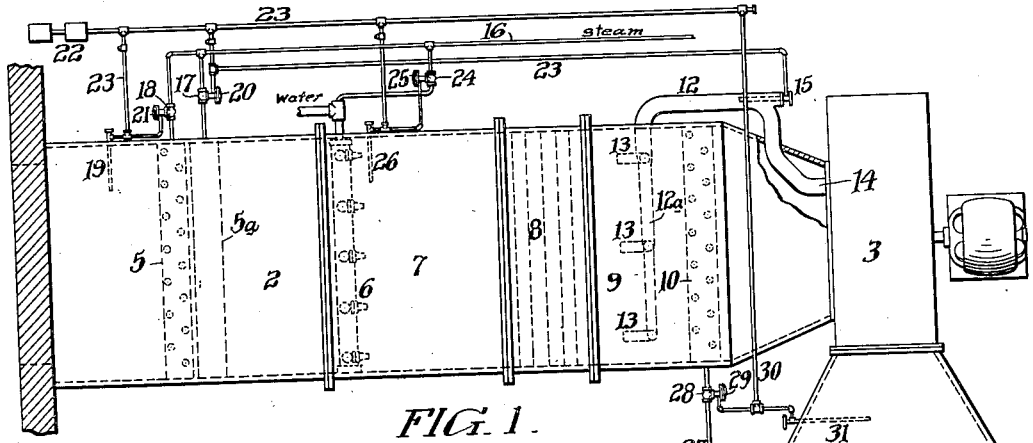
FIG. 1.
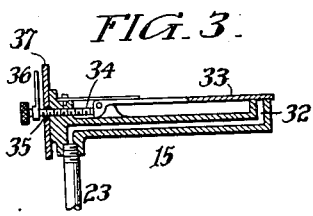
FIG. 3.
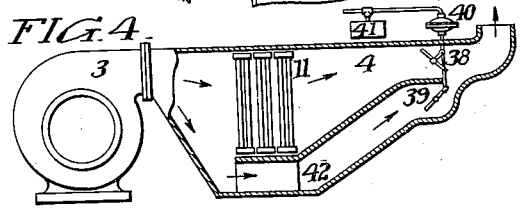
FIG. 4.
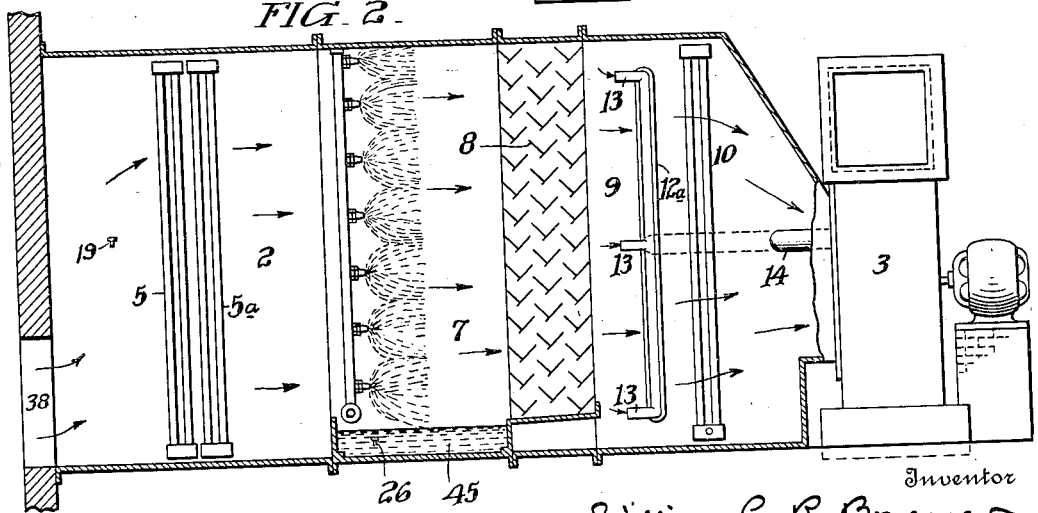
FIG. 2.
Witnesses
Daniel Webster Jr.
E. W. Smith
Inventor
William G. R. Braemer
By 
Attorney W. G. R. BRAEMER.
METHOD OF HUMIDITY CONTROL.
APPLICATION FILED MAR. 28, 1914.
1,101,902.
Patented June 30, 1914.
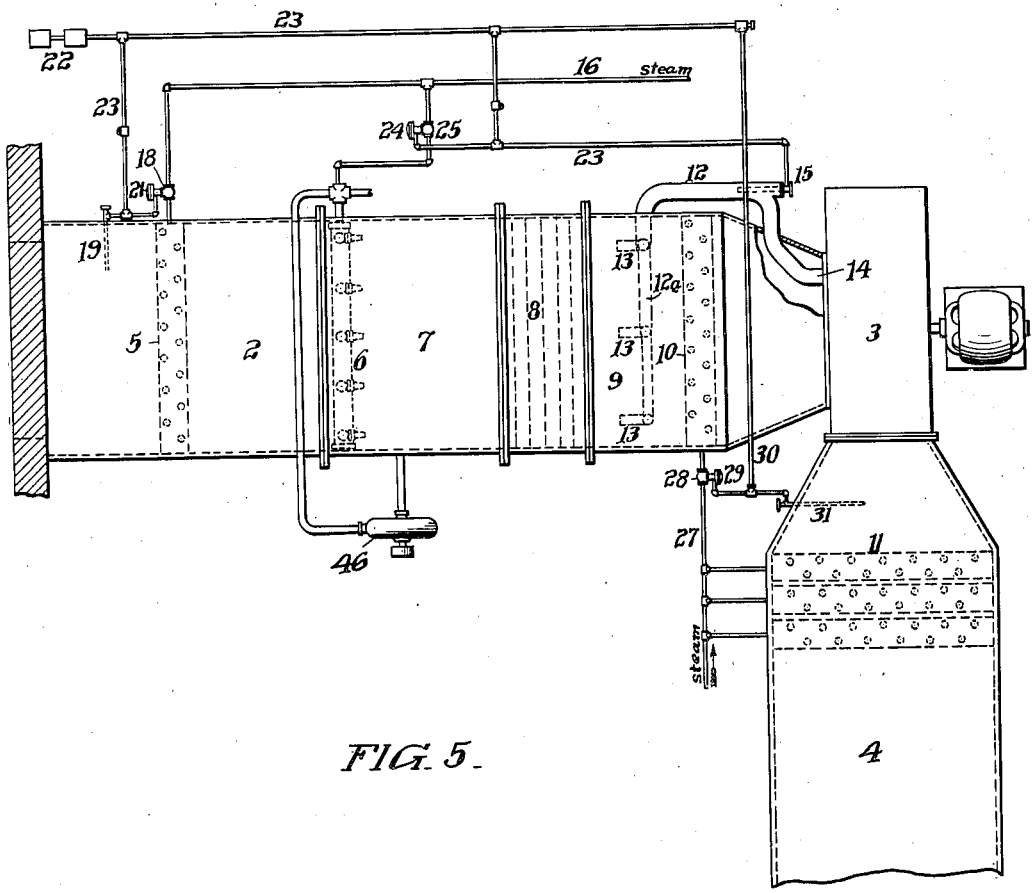
FIG. 5.
Witnesses
Daniel Webster, Jr.
E. W. Smith
Inventor
William G. R. Braemer
By 
Attorney

UNITED STATES PATENT OFFICE.

WILLIAM G. R. BRAEMER, OF CAMDEN, NEW JERSEY, ASSIGNOR TO WARREN WEBSTER & COMPANY, A CORPORATION OF NEW JERSEY.

METHOD OF HUMIDITY CONTROL.

1,101,902.         Specification of Letters Patent.         Patented June 30, 1914.

Original application filed April 2, 1913, Serial No. 758,297. Divided and this application filed March 28, 1914. Serial No. 827,834.

*To all whom it may concern:*

Be it known that I, WILLIAM G. R. BRAEMER, a citizen of the United States, and resident of Camden, county of Camden, and State of New Jersey, have invented an Improvement in Methods of Humidity Control, of which the following is a specification.

My invention relates to a method of humidity control and is in part a division of my application No. 758,297, filed April 2nd, 1913.

The object of my invention is to provide a method for obtaining a reasonably exact humidified condition of the air to be delivered for use by utilizing the average condition of the humidified air thus produced, so as to maintain conditions very closely approximating the predetermined theoretical condition required.

In carrying out the method of operation as applied to one type of apparatus, the fresh air is first subjected to heat from a suitable source and then to an aqueous vapor, which latter imparts to the warm air the requisite quantity of moisture to provide an absolute humidity at the temperature there prevailing, which will, when the humidified air is re-tempered or re-heated, impart a temperature which, in the subsequent use of the humidified air, will furnish the condition of relative humidity required in the room or place where the air is conveyed. This absolute humidity is maintained accurately by controlling the heating of the inflowing air by means of a suitable device such as a humidistat or thermostat, the actuation of which is controlled by an average mixture of different portions of the air which has been humidified. By my present method under the most preferred adaptations, the condition of the air delivered to the point of use is controlled by samples of air drawn off at suitable points, substantially in one plane transversely of the current and mixed to furnish an average of the body of humidified air at any moment, and this average mixture is utilized to control suitable automatic devices which cause the fresh air to be saturated with more or less moisture in suspension according to the conditions of the mixture, and insure the proper variation of the moisture absorbed by the air passing through the apparatus, whereby a substantially constant humidified condition is made possible. In carrying my method into practice I have shown in the accompanying drawings forms of apparatus which are at present preferred by me, though it will be understood that I do not wish to be restricted or limited to the exact constructions here disclosed.

Figure 1 is a plan of a type of humidifying apparatus in which my improved method may be carried out; Fig. 2 is a sectional elevation of the same; Fig. 3 is a sectional elevation of one form of controlling device for use in connection with my improved method; Fig. 4 is a diagrammatic elevation of a portion of the apparatus; and Fig. 5 is a plan view of another form of the humidifying apparatus in which my method may be carried into practice.

2 is the tubular casing or body of the apparatus and provides a longitudinal passageway which receives, at one end, fresh air, through a port or opening 38 and delivers the humidified air at the other end by means of a blower 3, which is operated by a suitable motor, said blower delivering the air to the conduit 4, leading to the room or place of use. The tubular passage 2 contains in its length, apparatus for heating, supplying moisture, removing excess moisture and for further tempering or reheating. The fresh air, on entering, is brought in contact with the tempering coils 5 and $5^a$, the temperature of which may be automatically regulated if desired as will later appear. The heated or tempered air is then passed into the humidifying compartment 7 in which saturated vapor from nozzles 6 is projected to impart to the heated air the moisture which is required to be absorbed. This saturated vapor is formed by introducing water which is heated, by means of steam, to a greater or less extent to suit the conditions prevailing in compartment 7, and may be regulated automatically by conditions of the humidified air. The surplus moisture carried by the air is removed by the eliminator structure 8, and the air which passes into the compartment 9 should then be in the condition in which it will have the necessary absolute quantity of moisture to meet the requirements of the air conditions to be delivered to the room. The absolute humidity, however, which is contained by the air at this point is utilized to provide the lower relative humidity necessary for the air after it has been raised in temperature to the condition required when it is delivered to the room. This increase of temperature and lowering of the relative humidity may be performed by the coils 10 and 11, the coils 11 being provided to give a large amount of the heat necessary to raise a portion of the humidified air and which, when mixed with a proper portion of the tempered or reheated air from the coils 10, will give the proper relative humidity required in the usual manner. The regulation, to maintain a constant temperature of the air before reaching the coils 11, is accomplished by the use of the coil 10, which is automatically controlled. The coil 10 is shown in conduit 2 between the nozzles 13 and blower 3, but this position is not essential as it would suffice for its purpose if located at any place between said nozzles and the reheating coils 11; I, however, prefer to place it as shown. The steam which is supplied to these coils at 10 and 11 is furnished by the steam pipes 27, and the supply of steam to the regulating or tempering coil 10 is controlled by the steam valve 28, which is operated by the motor 29 under the control of the thermostat 31 in the conduit for the air after it leaves the coils 10, and preferably as it leaves the blower.

As shown in Fig. 4, the humidified tempered air leaving the blower is divided, part passing through the reheating coils 11 and part passing through a by-pass 42 about said coils. The proper mixture of the air from the by-pass 42 and that from the reheating coils (higher temperature) may be secured by the regulating valves 38 and 39 under the control of the motor 40 and thermostat or humidistat 41 in the usual way.

The supply of steam to the spray water, to give it the proper tmperature before being sprayed by the nozzles 6, is regulated by a valve 24, operated by a motor 25, said motor being controlled by the thermostat 26 extending into or arranged in the compartment 7. Steam is supplied by the pipe 16 which connects with the valve 24 by a branch pipe. Similarly, steam from this pipe 16 is supplied to the tempering coil 5 under the control of a valve 18 and to the tempering coil 5ª under the control of a valve 17. The valve 18 is operated by a motor 21, controlled by the thermostat 19 within the inlet end of the casing, and the valve 17 is operated by a motor 20 under the control of the controlling device 15, which is responsive to variations in the average condition of the warm humidified air before passing to the blower and coils 10, previously referred to in a general way and now to be specifically referred to.

More specifically referring to the means of controlling the tempering coils 5ª, to vary the temperature of the inflowing air to be humidified and thereby varying this capacity for absorbing more or less moisture to compensate for variations in the humidity and temperature conditions in the outside atmosphere from which the fresh air is drawn into the apparatus, I provide a plurality of suction nozzles 13, in the compartment 9 back of the eliminator, said nozzles communicating with pipes 12ª discharging into a conduit 12 which empties by an outlet 14 into the suction part of the blower or fan 3, so that the normal action of the blower or fan for drawing air through the humidifying apparatus also draws the air through the various nozzles 13, causing it to pass as a mixture through the conduit 12, and in which conduit it is caused to act upon the controller 15 which may be a humidistat or thermostat. By its variation in humidity conditions, the air causes the controller to act to control the motor 20 in its function of regulating the amount of steam which is supplied to the regulating tempering coils 5ª. As indicated in the drawings, there are a number of these suction nozzles 13, but this is by way of example only, as I do not restrict myself in this regard, as it is manifest that the greater the number of such nozzles, the more accurate will be the average mixture sample of air which passes from the apparatus.

The construction of the controller 15, when employed as a humidistat, may be of the form set out in the patent to Edward W. Comfort, No. 977,933, and dated December 6. 1910. or of any other suitable construction. Similarly, the thermostats may be of any suitable construction, and for example the construction shown in Fig. 3 may be used. In this figure, 32 is an air nozzle into which air is sucked by pipe 23, said nozzle being controlled by a thermostatic valve 33 hinged to the body, said valve being adjusted to open the nozzle for any given temperature by the screw 35 having a pointer 36 movable over a temperature dial 37. A spring 34 acts to hold the valve 33 against the screw. This device may be used as the controlling means 15, if so desired. The suction of air through the nozzle of the thermostat or humidistat is produced by a small vacuum pump 22 and suction mains 23 in the usual manner.

In Fig. 5 I have shown a modified apparatus for carrying out the method of my invention, wherein the tempering coils 5 are not only automatically regulated to vary the temperature of the incoming fresh air, but the saturated vapor from the nozzle 6 is also subject to automatic regulation and controlled by the condition of the average mixture of the samples withdrawn by way of the nozzles 13. In carrying out this form of the apparatus the suction main 23 forms a connection between the controlling device 15 and the motor 25ª which controls the valve 24ª for admitting steam to the water being supplied to the nozzles 6. It will be noted that this change of construction preferably dispenses with a connection between the tempering coil valve and the controlling device 15, and these tempering coils, if employed, are therefore regulated directly by the temperature of the incoming air. The absolute humidity of the air is therefore controlled by automatic regulation of the temperature of the water sprayed into air delivered to the chamber 7, said regulation being made under the control of a device such as a thermostat or a humidistat operated by the condition of the average mixture of the sample of air withdrawn, as hereinbefore described. The water utilized for saturating the air is preferably taken from the tank 45 and is circulated and re-circulated by any desired type of pump, such as the rotary pump 46, the operation of which is apparent.

It will now be understood that I have devised a method of moisture regulation which, broadly considered, is adapted in its application for use in connection with substantially all types of humidity control system, and while I have shown two forms of mechanism for carrying the invention into practice, it will be apparent that I do not wish to be limited thereto. So far as I am aware I am the first in the art of humidity control to provide a method of regulation embodying control devices governed by the average condition of the humidified air, which average is determined or obtained from a mixture of several samples of the air taken at different points.

Having thus described my invention, what I claim and desire to protect by Letters Patent is:—

1. The herein described method of obtaining humidified air having substantially constant humidity, which consists in treating the fresh air to an aqueous vapor to impart to it approximately the humidity required, simultaneously collecting a plurality of samples from different portions of the flowing body of humidified air taken at substantially the same transverse section of the conduit through which the air is flowing, mixing the several samples to provide a common average sample of the humidified air, and varying the temperature of the fresh air before it is subjected to the aqueous vapor under the control of the condition of the average sample of humidified air, whereby the humidity of the treated air may be maintained substantially constant.

2. The herein described method of obtaining humidified air having substantially constant humidity, which consists in treating the fresh air to an aqueous vapor to impart to it approximately the humidity required, simultaneously collecting a plurality of samples from different portions of the flowing body of humidified air taken at substantially the same transverse section of the conduit through which the air is flowing, mixing the several samples to provide a common average sample of the humidified air, varying the temperature of the fresh air before it is subjected to the aqueous vapor under the control of the condition of the average sample of humidified air, whereby the humidity of the treated air may be maintained substantially constant, and raising the temperature of the humidified air and lowering its relative humidity after it has passed the place where the plurality of samples had been taken.

3. The herein described method of obtaining humidified air having substantially constant absolute humidity, which consists in treating the fresh air passing through a conduit to an aqueous vapor to impart to it approximately the humidity required, simultaneously collecting a plurality of samples from different portions of the flowing body of humidified air, said samples taken from different portions of the same cross section of the conduit, mixing the said samples to provide a common average sample of the humidified air and varying the temperature of the fresh air under the control of the conditions of the average sample of humidified air, whereby the humidity of the treated air may be maintained substantially constant.

4. The herein described method of obtaining humidified air having substantially constant absolute humidity, which consists in causing the air to pass through a conduit and become saturated with moisture at a temperature above that of the atmosphere, simultaneously collecting a plurality of samples of the flowing body of humidified air taken from different portions of the same section of the conduit, mixing the several samples to provide a common average sample of the humidified air, and regulating the temperature of the saturated air under the control of the condition of the average sample of humidified air to vary the amount of moisture the said saturated air will contain.

5. The herein described method of obtaining humidified air, having substantially constant absolute humidity which consists in treating the fresh air passing through a conduit to an aqueous vapor to impart to it approximately the humidity required, simultaneously collecting a plurality of samples of the flowing body of humidified air taken from different portions of the same cross section of the conduit, mixing the several samples to provide a common average sample of the humidified air, varying the temperature of the aqueous vapor under the control of the condition of the average sample of humidified air, and automatically varying the temperature of the fresh air before it is subjected to the aqueous vapor.

In testimony of which invention, I hereunto set my hand.

WILLIAM G. R. BRAEMER.

Witnesses:
HORACE D. REEVE,
E. W. SMITH.